(12) United States Patent
Curran-Gray et al.

(10) Patent No.: US 8,009,557 B2
(45) Date of Patent: Aug. 30, 2011

(54) COMMUNICATIONS SYSTEM, APPARATUS FOR CREATING A SUB-CHANNEL AND METHOD THEREFOR

(75) Inventors: Martin Curran-Gray, Fife (GB); Slawomir K. Ilnicki, Los Altos Hills, CA (US); Takashi Hidai, Palo Alto, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 550 days.

(21) Appl. No.: 11/412,642

(22) Filed: Apr. 27, 2006

(65) Prior Publication Data

US 2007/0253441 A1 Nov. 1, 2007

(51) Int. Cl.
*G06F 11/00* (2006.01)
(52) U.S. Cl. .......................................... 370/229
(58) Field of Classification Search .............. 370/200, 370/236, 229–235, 237
See application file for complete search history.

(56) References Cited

U.S. PATENT DOCUMENTS

| | | | | | |
|---|---|---|---|---|---|
| 4,683,563 | A | * | 7/1987 | Rouse et al. | 370/224 |
| 5,956,330 | A | * | 9/1999 | Kerns | 370/336 |
| 6,314,110 | B1 | * | 11/2001 | Chin et al. | 370/468 |
| 6,529,518 | B1 | * | 3/2003 | Webber | 370/403 |
| 6,574,794 | B1 | * | 6/2003 | Sarraf | 725/63 |
| 6,646,985 | B1 | | 11/2003 | Park et al. | |
| 7,177,323 | B2 | * | 2/2007 | Yavatkar et al. | 370/468 |
| 7,466,652 | B2 | * | 12/2008 | Lau et al. | 370/230.1 |
| 7,564,785 | B2 | * | 7/2009 | Krishnamurthi et al. | 370/230 |
| 2002/0186721 | A1 | * | 12/2002 | Bohn | 370/522 |
| 2004/0010592 | A1 | * | 1/2004 | Carver et al. | 709/226 |
| 2004/0064508 | A1 | * | 4/2004 | Ayyagari et al. | 709/205 |
| 2005/0041595 | A1 | | 2/2005 | Uzun et al. | |
| 2005/0083957 | A1 | | 4/2005 | Ilnicki et al. | |

FOREIGN PATENT DOCUMENTS

EP 1 524 807 A1 4/2005

OTHER PUBLICATIONS

German Patent and Trademark Office, 4 month office action dated Oct. 1, 2009.

* cited by examiner

*Primary Examiner* — Derrick Ferris
*Assistant Examiner* — Mang Yeung
(74) *Attorney, Agent, or Firm* — Mathew A. Pequignot; Pequignot + Myers LLC

(57) ABSTRACT

A communications apparatus includes an input for receiving a data stream being transmitted from a first network node to a second network node using a main channel. A processing resource of the communications apparatus identifies data signifying an idle period within the data stream and determines whether the idle period is at least a suitable minimum duration to support initiating transmission of sub-channel data in place of at least part of the data signifying the idle period. Further, the processing resource is arranged to identify when the idle period is not of the suitable minimum duration and a need arises to transmit the sub-channel data within a predetermined period of time. In such circumstances, the processing resource sends a flow control message upstream to the first network node to halt transmissions therefrom, thereby generating the idle period of at least the suitable minimum duration.

13 Claims, 3 Drawing Sheets

COMMUNICATIONS SYSTEM, APPARATUS FOR CREATING A SUB-CHANNEL AND METHOD THEREFOR

The present invention relates to an apparatus for creating a sub-channel in a main channel of the type, for example, that supports communications between a first network node and a second network node. The present invention also relates to a communications system for supporting a sub-channel within a main channel of the type, for example, that supports communications between a first network node and a second network node. The present invention further relates to a method of creating a sub-channel within a main channel of the type, for example, that supports communications between a first network node and a second network node.

BACKGROUND ART

In the field of network communications, it is known to implement passive measurement techniques at selected points in a communications network in order to monitor Quality of Service levels and diagnose faults that can occur from time-to-time in the communications network.

In this respect, it is known to deploy so-called "passive probes" at the selected points in the communications network. Such passive probes make measurements relating to network traffic travelling along one or more links in the communications network. Additionally, once collected, measurement data has to be communicated to, for example, a central monitoring station in the communications network for analysis and interpretation.

In order to convey the measurement data from a passive probe to the central monitoring station, US 2005/0083957 A1 proposes a low bandwidth channel formed by inserting packets into a high bandwidth packet stream. The packets are inserted at a predetermined interval, insertion causing latency that is recovered by minimising inter-packet gaps in the incoming high bandwidth channel. While the packets to be inserted are being transmitted, arriving high bandwidth packets are stored in an elastic buffer.

However, whilst the above technique provides a mechanism for achieving the low bandwidth channel in the high bandwidth packet stream, it is desirable to improve performance of the low bandwidth channel. In particular, the above-described technique relies upon the existence of sufficiently large "gaps" in the high bandwidth data stream that can be reduced to allocate bandwidth to accommodate transmission time for the low bandwidth channel. However, the above apparatus preserves traffic flow in the high bandwidth data stream as the traffic in the high bandwidth data stream is considered to be of greater importance than the traffic using the low bandwidth channel. This is an overriding principle to which operation of the above apparatus adheres. Hence, if insufficient gaps exist in the high bandwidth data stream, transmissions on the low bandwidth channel have to be halted due to lack of bandwidth until a sufficiently large gap occurs in the high bandwidth stream.

As a result of a temporary incapability to transmit on the low bandwidth channel, it is necessary to buffer the measurement data to be transmitted until the measurement data can be transmitted. Whilst the apparatus described above comprises the elastic buffer, there is a limit to elasticity of the buffer. To avoid running out of buffer capacity, the apparatus reaches a point where creation of new packets has to be temporarily halted until bandwidth becomes available to resume transmission of the measurement data. Alternatively, the apparatus discards packets already created (and in the buffer) in order to provide capacity in the buffer for newly created packets containing measurement data.

SUMMARY OF THE DISCLOSED EMBODIMENTS

According to a first aspect of the present invention, there is provided an apparatus for creating a sub-channel within a main channel between a first network node and a second network node, the apparatus comprising: a data store for temporarily storing sub-channel data; a processing resource for monitoring downstream communication from the first network node, the processing resource being arranged, when in use, to identify a suitable channel condition in the downstream communication, and to determine whether insufficient time exists to await probabilistic occurrence of the suitable channel condition before a deadline to transmit the sub-channel data is reached, the suitable channel condition supporting initiation of transmission of the sub-channel data in place of at least part of data for signifying an idle period in the downstream communications; wherein the processing resource is further arranged to transmit upstream, when in use, a flow control message for receipt by the first network node, thereby causing timely generation of the suitable channel condition before the deadline.

The processing resource may be arranged to identify, when in use, the at least part of the data for signifying the idle period in the downstream communication, and to determine whether insufficient time exists to await probabilistic occurrence of a subsequent idle period before the deadline to transmit the sub-channel data is reached, the subsequent idle period being required when the data for signifying the idle period does not correspond to at least a predetermined suitable minimum duration to support the initiation of transmission of the sub-channel data in place of the at least part of the data for signifying the idle period; and the timely generation of the suitable channel condition is timely generation of at least part of the subsequent idle period before the deadline, the at least part of the subsequent idle period having at least the predetermined suitable minimum duration.

The processing resource may be further arranged to initiate transmission of the sub-channel data in place of subsequent data for signifying the at least part of the subsequent idle period.

The processing resource may be arranged to determine whether the data for signifying the idle period does not correspond to at least an average duration to support the initiation of transmission of the sub-channel data.

The apparatus may further comprise: memory operable to hold an extra packet constituting the sub-channel data; memory operable to hold a parallel datastream while the extra packet is being sent; and control logic.

The apparatus may further comprise a deserialiser operable to convert a serial datastream to the parallel datastream for the downstream communications on the main channel, and a serialiser operable to convert the parallel datastream back to the serial datastream.

The processing resource may be arranged to determine whether flow control is supported for the downstream communications on the main channel. A time limit may be associated with the flow control message.

The processing resource may be arranged to allow the time limit to expire.

The processing resource may be arranged to send a subsequent flow control message for receipt by the first network node, thereby terminating the subsequent idle period. A substantially zero time limit may be associated with the subsequent flow control message.

According to a second aspect of the present invention, there is provided a probe for monitoring signals in a communications network, the probe comprising the apparatus as set forth above in relation to the first aspect of the invention.

According to a third aspect of the present invention, there is provided an interface converter module comprising the apparatus as set forth above in relation to the first aspect of the invention.

According to a fourth aspect of the present invention, there is provided a communications system for supporting a sub-channel within a main channel, the system comprising: a first network node and a second network node for supporting the main channel therebetween; a data store for temporarily storing sub-channel data; a network monitoring apparatus for monitoring downstream communications from the first network node, the network monitoring apparatus being arranged to identify, when in use, a suitable channel condition in the downstream communications, and to determine whether insufficient time exists to await probabilistic occurrence of the suitable channel condition before a deadline to transmit the sub-channel data is reached, the suitable channel condition supporting initiation of transmission of the sub-channel data in place of at least part of data for signifying an idle period in the downstream communications; wherein the network monitoring apparatus is further arranged to transmit, when in use, a flow control message to the first network node, thereby causing timely generation of the suitable channel condition before the deadline.

According to a fifth aspect of the present invention, there is provided a method of creating a sub-channel within a main channel between a first network node and a second network node, the method comprising: temporarily storing sub-channel data; monitoring downstream communications from the first network node; identifying a suitable channel condition in the downstream communications; determining whether insufficient time exists to await probabilistic occurrence of the suitable channel condition before a deadline to transmit the sub-channel data is reached, the suitable channel condition supporting initiation of transmission of the sub-channel data in place of at least part of data for signifying an idle period; and transmitting upstream a flow control message for receipt by the first network node, thereby causing timely generation of the suitable channel condition before the deadline.

According to a sixth aspect of the present invention, there is provided a computer program element comprising computer program code means to make a computer execute the method as set forth above in relation to the fifth aspect of the invention.

The computer program code element may be embodied on a computer readable medium.

It is thus possible to provide a system, apparatus and method therefor that are capable of creating opportunities to send the sub-channel data when at least one channel condition is insufficient, for example the idle periods detected are of insufficient length, to support initiation of transmission of the sub-channel data and a sufficiently long idle period cannot be awaited, for example due to a constraint, such as a buffer size. Data loss in relation to the sub-channel can therefore be obviated or at least mitigated. It is also possible to send, with minimal delay, high priority data, such as an alarm message, without having to wait for sufficiently large gaps in the datastream of the main channel.

BRIEF DESCRIPTION OF DRAWINGS

At least one embodiment of the invention will now be described, by way of example only, with reference to the accompanying drawings, in which.

DETAILED DESCRIPTION

Figure 1:
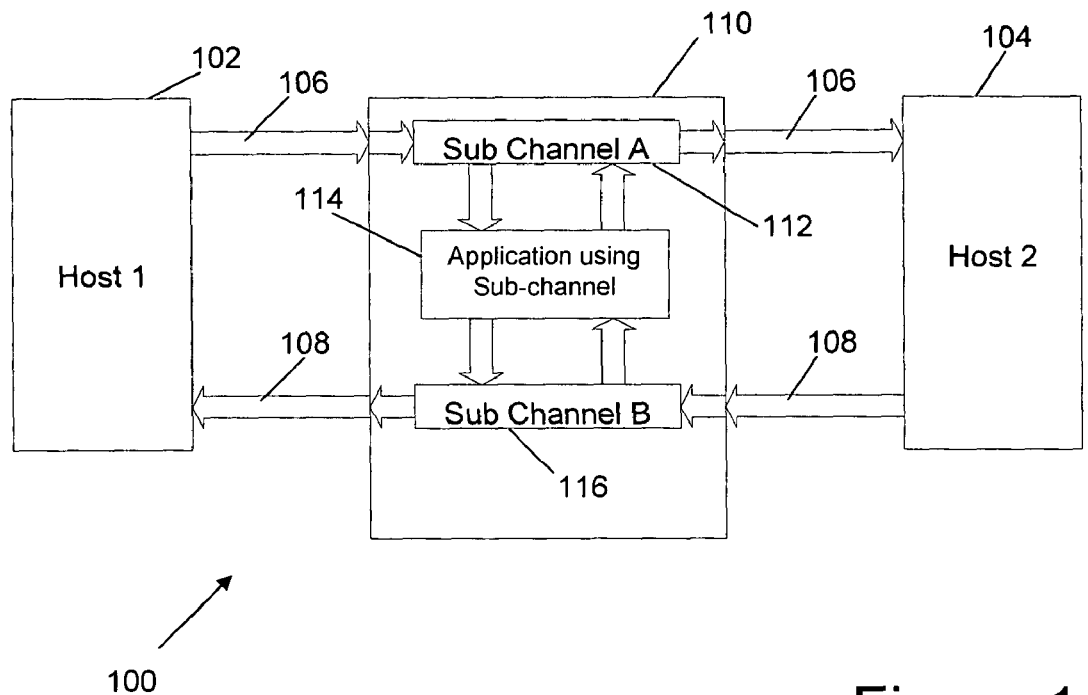
FIG. 1 is a schematic diagram of a communications system comprising a communications apparatus constituting an embodiment of the invention.

Throughout the following description identical reference numerals will be used to identify like parts.

Referring to FIG. 1, a communications system 100 comprises a first network node, for example a first host 102 capable of communicating with a second network node, for example a second host 104. The first host 102 is therefore coupled to the second host 104 by a first unidirectional communications link 106 in a first direction and a second unidirectional communications link 108 in a second direction opposite to the first direction, thereby providing communications media for bi-directional communications. In this example, the first host 102 is a first router and the second host 104 is a second router, the first and second routers together providing connectivity between domains (not shown) in a communications network (also not shown). However, the skilled person will appreciate that the first and second hosts 102, 104 can be other functional pairs of communications elements, for example an Ethernet card in a Personal Computer and a router.

The first and second unidirectional communications links 106, 108 are each supported, in this example, by a respective optical fibre. A first main communications channel is supported by the first unidirectional communications link 106 and a second main communications channel is supported by the second unidirectional communications link 108.

In order to support a first sub-channel in the first main channel, and a second sub-channel in the second main channel, an in-line sub-channel apparatus 110 of the type described in EP-A1-1 524 807 is disposed in the first and second communications links 106, 108 between the first and second hosts 102, 104. Although the structure and operation of the in-line sub-channel apparatus 110 is well-documented in EP-A1-1 524 807, for the sake of ease of reference and ready understanding of the additional and/or alternative functionality described later herein, the structure of the in-line sub-channel apparatus 110 will now be briefly described.

The in-line sub-channel apparatus 110 comprises a first sub-channel injector 112 coupled to an application logic 114 that uses the first sub-channel supported by the first sub-channel injector 112. In contrast with EP-A1-1 524 807, the in-line sub-channel apparatus 110 also comprises a second sub-channel injector 116 coupled to the application logic 114 as the application logic 114 also uses, in this example, the second sub-channel supported by the second sub-channel injector 116. Since the second sub-channel injector 116 is a reverse-direction implementation of the first sub-channel injector 112, the second sub-channel injector 116 will not be described further except in passing reference, since the skilled person will appreciate the structure and functions of the second sub-channel injector 116 from a description of the first sub-channel injector 112. Consequently, for the sake of simplicity and conciseness of description, the "first main channel" will now be referred to as the "main channel", and the "first sub-channel" will now be referred to as the "sub-channel" as no further references will be made herein to the second main channel or the second sub-channel.

Figure 2:
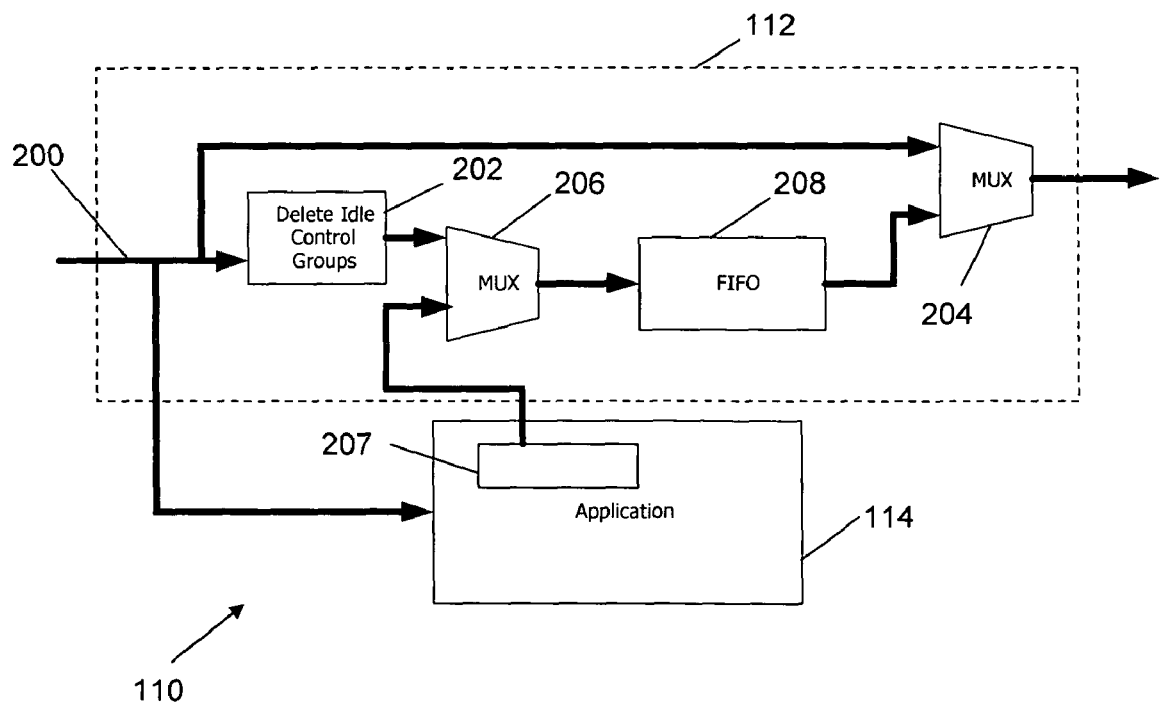
FIG. 2 is a schematic diagram of the communications apparatus of FIG. 1 in greater detail.

Turning to FIG. 2, the application logic 114 is coupled to a datastream input 200 of the first sub-channel injector 112. The datastream input 200 is also coupled to an input of an idle deletion module 202 and a first input of a first multiplexer 204. An output of the idle deletion module 202 is coupled to a first input of a second multiplexer 206, a second input of the second multiplexer 206 being coupled to an internal buffer 207 of the application logic 114. An output of the second multiplexer 206 is coupled to an input of a First-In-First-Out (FIFO) buffer 208, an output of the FIFO buffer 208 being coupled to a second input of the first multiplexer 204.

Although not shown and not required if data is to be processed in serial form, a de-serialiser module is coupled before the datastream input 200 to perform a serial-to-parallel conversion on incoming data arriving at the first sub-channel injector 112 and a serialiser module is coupled to an output of the first multiplexer 204 to perform a parallel-to-serial conversion on outgoing data leaving the first sub-channel injector 112.

In operation, the communications system 100 supports a Gigabit Ethernet protocol in accordance with the Institute of Electrical and Electronic Engineers (IEEE) Standard 802.3 and the in-line sub-channel apparatus 110 is capable of functioning in a manner described in EP-A1-1 524 807. However, the skilled person will recognize that the functionality of the in-line sub-channel apparatus 110 can be modified to include only some of the functionality described in EP-A1-1 524 807. Likewise, in the present example, the functionality of the in-line sub-channel apparatus 110 can be modified to enhance functionality of the in-line sub-channel apparatus 110.

In this respect, the in-line sub-channel apparatus 110 is part of a communications monitoring apparatus (not shown), for example a probe, such as any suitable probe for measuring network performance, that generates measurement data in relation to a given communications link, for example the first unidirectional communications link 106. In this example, the measurement data generated has to be forwarded to a central monitoring station for analysis in order to monitor Quality of Service of, inter alia, the communications system 100 and diagnose any faults. The measurement data generated has to be stored temporarily as packetised data by the application logic 114 for onward transmission. However, the storage capacity of application logic 114 is finite and the application logic 114 has to await suitable channel conditions in order to be able to inject at least one packet into a datastream on the main channel, the datastream being transmitted from the first host 102 to the second host 104.

When the first host 102 does not need to communicate with the second host 104, the first host 102, instead of simply remaining inactive during an idle period, sends data signifying the idle period in the datastream to the second host 104 in accordance with the IEEE 802.3 standard. As described in EP-A1-1 524 807, the in-line sub-channel apparatus 110 exploits idle periods on the main channel to support the sub-channel.

Figure 3:
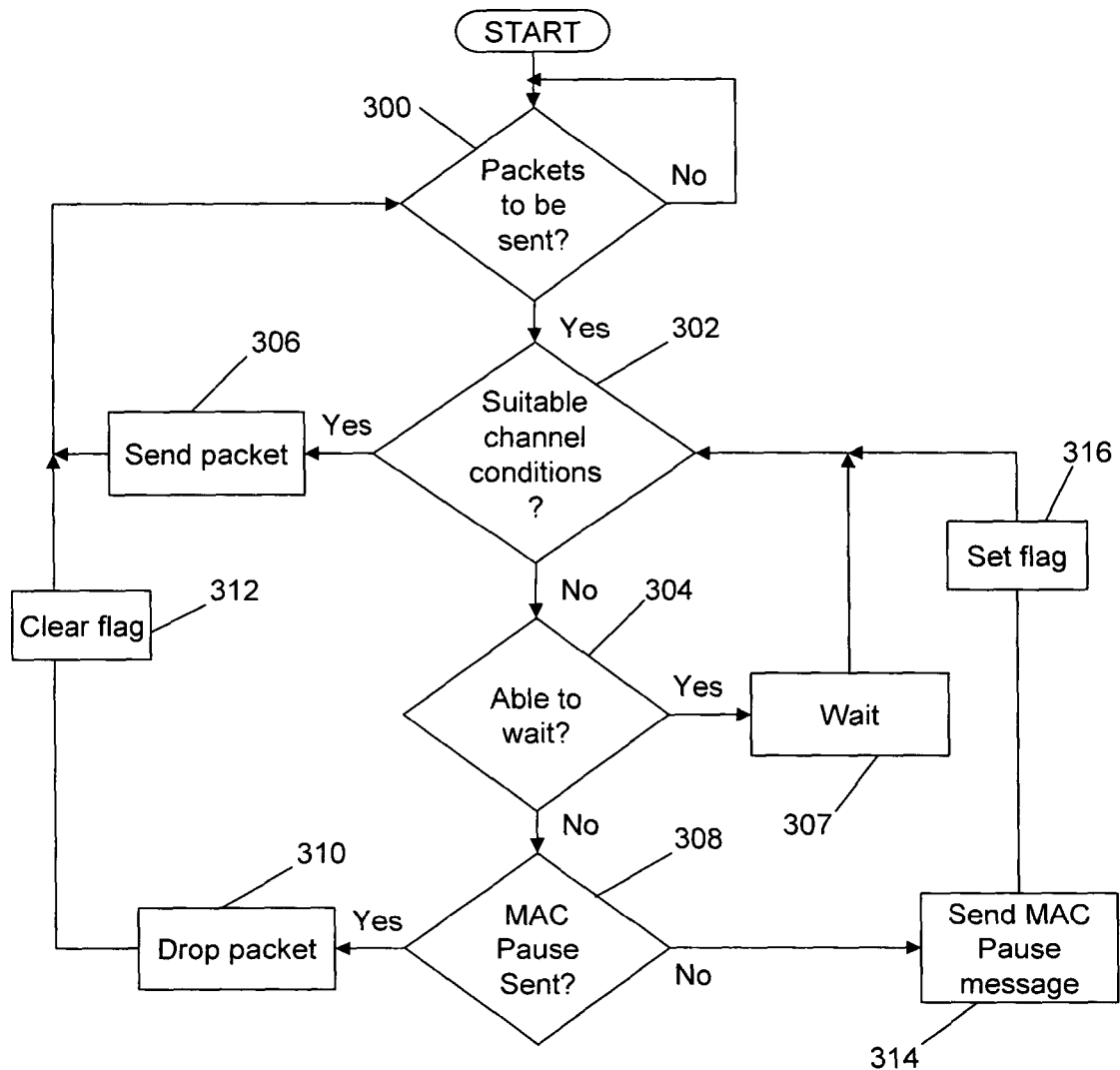
FIG. 3 is a flow diagram of a method employed by the communications apparatus of FIG. 1 and FIG. 2.
Figure 4:
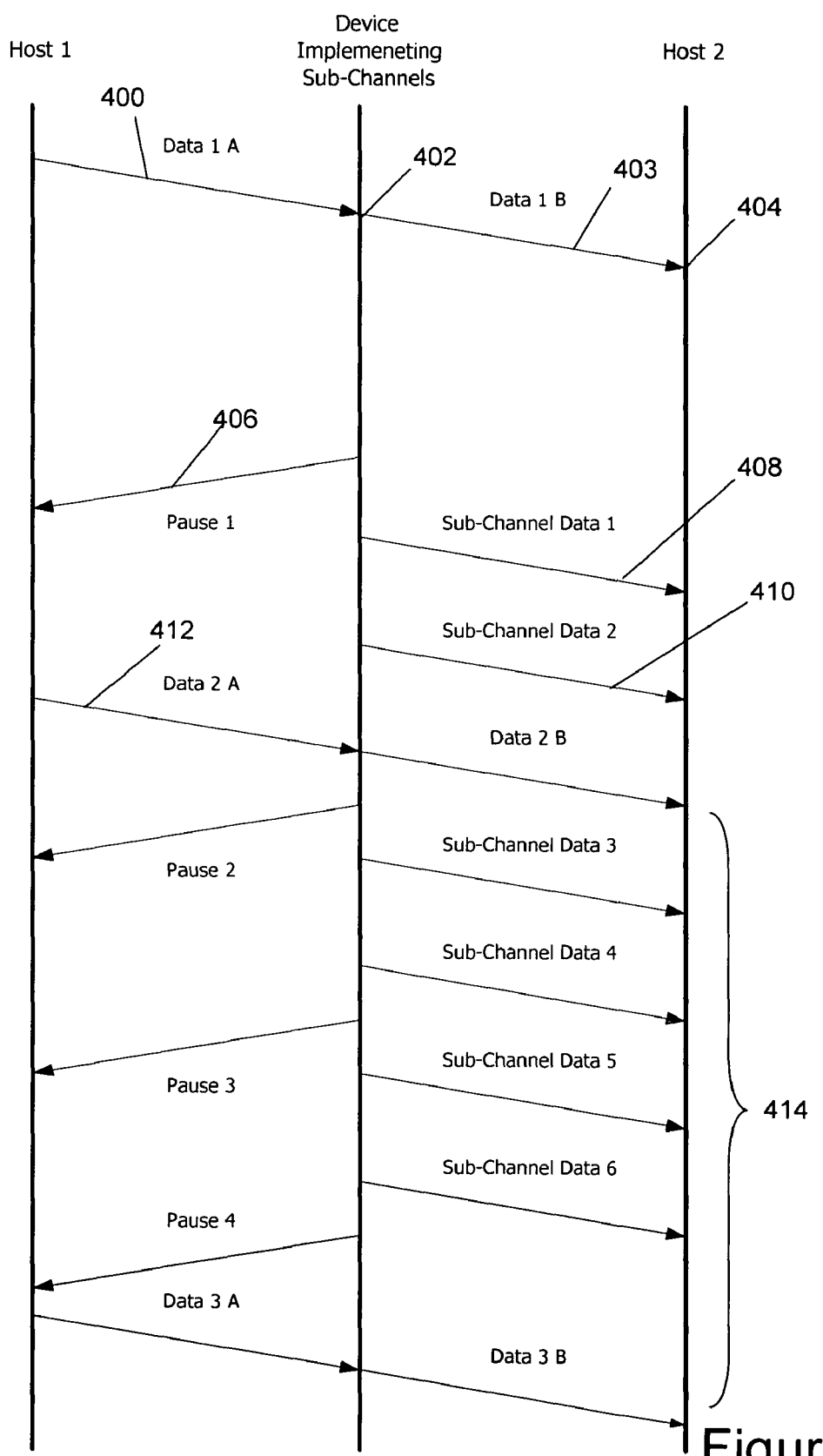
FIG. 4 is an event timing diagram of repeated invocations of the method of FIG. 3.

Turning to FIG. 3, the application logic 114 monitors the internal buffer 207 in order to determine (300) whether the internal buffer 207 has packets containing measurement data to be sent. If the internal buffer 207 is empty, the application logic 114 continues monitoring the status of the internal buffer 207. Referring to FIG. 4, in accordance with a by-pass mode, an incoming frame of data 400 is received (402) by the in-line sub-channel apparatus 110. The incoming frame of data 400 is passed to the first multiplexer 204 without further interference, and hence delay, caused by the application logic 114, whereupon an output frame 403, constituting an unmodified version of the incoming frame of data 400, is sent by the in-line sub-channel apparatus 110 for receipt (404) by the second host 104. Referring back to FIG. 3, in the event that the internal buffer 207 contains one or more packet to be transmitted using the sub-channel, the application logic 114 determines (302) whether conditions on the main channel are suitable to support initiation of transmission of at least one packet being stored by the internal buffer 207. Consequently, the data signifying the idle period must be detected and, for example, occurrences of idle periods on the main channel may not be of sufficient length to support initiation of transmission of at least part of the sub-channel data, i.e. data stored by the internal buffer 207. Another condition that may need to be met (depending upon system requirements) is whether a so-called "hold timer", as described in EP-A1-1 524 807, has expired. Additionally or alternatively, the condition can be whether a detected idle period exceeds a calculated average duration. In this example, for the sake of simplicity of description, the application logic 114 only verifies if a detected idle period, identified by data codes conforming to the IEEE 802.3 standard, is greater than a predetermined minimum suitable duration.

If the idle period is greater than the predetermined minimum suitable duration, the in-line sub-channel apparatus 110 sends (306) the at least part of the sub-channel data in accordance with the technique described in EP-A1-1 524 807 and depending upon the capacity of the FIFO buffer 208. On the other hand, if the conditions on the main channel are not suitable, for example the above minimum duration condition has not been met, the application logic 114 determines (306) whether waiting a predetermined delay period is permissible, for example without resulting in overflow of the internal buffer 207. The occurrence of the suitable channel condition is, of course, probabilistic. However, if it is possible to wait the predetermined delay period, the application logic 114 abstains (307) from sending the at least part of the sub-channel data for the predetermined delay period and then reverts to determining (302) whether the conditions on the main channel are now suitable for implementing the sub-channel.

If it is not possible to delay transmission on the sub-channel without a resulting overflow of the internal buffer 207, the application logic 114 determines (308) whether a flow control message has been sent to the first host 102, for example a Media Access Control (MAC) Pause frame. The above use of flow control in the communications system 100 is aspirational on the part of the in-line sub-channel apparatus 110 and so verification that the flow control message has been sent has to take place in order to ascertain whether the flow control is being employed between the first and second hosts 102, 104. In this respect, symmetric flow control can be in operation if flow control is supported by both the first and second hosts 102, 104 or asymmetric flow control can be in operation if flow control is only supported by the first host 102. However, if only the second host 104 supports flow control or neither the first host 102 nor the second host 104 support flow control, then the in-line sub-channel apparatus 110 has to provide a mechanism alternate to that described herein to avoid overflow of the internal buffer 207, otherwise overflow is risked. The application logic 114 can, of course in another embodiment, be configured to detect whether the first host 102, the second host 104, both or neither support flow control by monitoring, for example an autonegotiation procedure between the first and second hosts 102, 104 at start-up of the first and/or second host 102, 104, but such a monitoring facility is not essential and the implementation described herein based upon an optimistic attitude to implementation of flow control is adequate.

In the event that control of the datastream transmitted by the first host 102 is not possible, the application logic 114 is implicitly "aware" of the lack of flow control support by the first host 102 by virtue of the flow control message already having been sent. Recordal of prior use of the flow control message is recorded by a flag (not shown).

Hence, if the flow control message has already been sent once and the conditions on the main channel remain unchanged, flow control is assumed currently not to be implemented by the first host 102 and the application logic 114 has no choice but to drop (310) a packet from the internal buffer 207 in order to avoid overflow thereof (assuming no alternative mechanism has been implemented). The flag is then cleared (312) by the application logic 114 and the application logic 114 reverts to determining (300) whether further packets need to be sent, but are currently stored in the internal buffer 207.

Alternatively, if the flag has not been previously set, indicting that transmission of the flow control message has not been attempted in respect of the at least part of the sub-channel data that needs to be sent, the application logic 114, using the second sub-channel injector 116, sends (314) the flow control message 406 (FIG. 4) containing a pause duration of a value, for example, sufficiently large to enable transmission of the at least part of the sub-channel data to the first host 102, and then sets (316) the flag to indicate that the flow control message has been sent and then awaits at least one suitable channel condition, for example detection of idle code groups.

In response to the MAC Pause frame, the first host 102 finishes sending any frames currently in the process of transmission and then sends so-called IDLE characters in place of frames of data, i.e. data signifying a subsequent idle period, corresponding to the pause duration.

The application logic 114, which has now returned to determining (302) whether conditions on the main channel are now suitable for sending the at least part of the sub-channel data, detects the IDLE characters received, the IDLE characters corresponding to the pause duration that is greater than the predetermined minimum suitable duration. Consequently, the in-line sub-channel apparatus 110 is able to send (306) the at least part of the sub-channel data in a manner described in EP-A1-1 524 807. In this example, a first packet 408 containing first measurement data is sent, followed by a second packet 410 containing second measurement data. Thus, timely removal of data from the internal buffer 207 is achieved, thereby avoiding overflow of the internal buffer 207.

Referring back to FIG. 4, once sufficient sub-channel data to provide overflow relief to the internal buffer 207 has been sent, the in-line sub-channel apparatus 110 can revert to the operation described in EP-A1-1 524 807 (modified in whatever way so desired) as sufficient time now exists to await suitable conditions on the main channel. In this respect, the in-line sub-channel apparatus 110 can continue implementing the pass-through mode to let data frames 412 transmitted by the first host 102 to the second host 104 pass through the in-line sub-channel apparatus 110 without delay.

Any subsequent need 414 to force idle periods in the datastream from the first host 102 can be implemented in the manner already described above.

However, excessively long pause durations or excessive use of flow control messages within a given period of time can result in excessive dropping of packets or permanent changes to routing tables by routers as a result of an inference by the routers of an existence of a downstream communications problem. Therefore, the application logic 114 can be arranged to estimate a required pause duration for injecting one or more packets that needs to be sent. If appropriate, the estimated pause duration is incorporated into the Pause control frame. The estimated pause duration can be deemed appropriate if a suitable predetermined interval of time has elapsed since transmission of a previous Pause control frame.

Of course, it should also be appreciated that if the in-line sub-channel apparatus 110 finishes transmitting sub-channel data before expiry of the pause duration, a subsequent flow control message can be sent to the first host 102 having a reduced pause duration of substantially zero time, the reduced pause duration superseding the existing pause duration being implemented and resulting in resumption of transmission of data frames from the first host 102 to the second host 104 in accordance with the IEEE 802.3 standard.

Although the above examples have been described in the context of packet communications, it should be appreciated that the term "message" is intended to the construed as embracing packets, datagrams, frames, cells and/or protocol data units and so these terms should be understood to be interchangeable. Therefore, in the context as described herein, it should be understood that a "packet" is not just an IP packet but it is a frame that can contain an IP packet. In the case of Ethernet, it is an Ethernet frame that may already be encoded, for example using 8B/10B encoding. The type of encoding will depend on encoding techniques used by passing traffic on the main channel.

Whilst it has been suggested above that the in-line sub-channel apparatus is implemented in a probe, the skilled person will appreciate that the in-line sub-channel apparatus 110 can be implemented in various forms, for example in a highly integrated form suitable for replacing industry-standard interface converter modules, for example those known as GigaBit Interface Converters (GBICs). Current GBICs are effectively transceivers that translate signals of one media type, for example optical or electrical, to another media type. By providing a replacement GBIC including the in-line sub-channel apparatus, numerous applications requiring sub-channels are further enabled.

Alternative embodiments of the invention can be implemented as a computer program product for use with a computer system, the computer program product being, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

What is claimed is:

1. An apparatus for creating a sub-channel within a main channel between a first network node and a second network node, the apparatus comprising:
   a communication monitoring apparatus for generating measurement data in relation to a communication link between the first and second network nodes;
   a data store for temporarily storing sub-channel data comprised of the measurement data;
   a processing resource for monitoring downstream communication from the first network node, the processing resource being arranged, when in use, to identify a predetermined minimum idle duration in the downstream communication, and to determine whether the predetermined minimum idle duration will occur before the data store overflows, the predetermined minimum idle duration supporting initiation of transmission of the sub-channel data in place of at least part of data for signifying an idle period in the downstream communications;

wherein the processing resource is further arranged to transmit upstream, when in use, a flow control message for receipt by the first network node, to cause generation of the predetermined minimum idle duration before the data store overflows;

wherein the processing resource is further arranged to drop a packet of the sub-channel data from the data store in order to avoid overflow of the data store if the first network node does not implement flow control to reduce affect on the transmission of the main channel;

wherein the processing resource is arranged to identify, when in use, the at least part of the data for signifying the idle period in the downstream communication, and to determine whether a subsequent idle period for the main channel will occur and whether insufficient time exists to await probabilistic occurrence of a subsequent idle period, the subsequent idle period being required when the data for signifying the idle period does not correspond to at least the predetermined minimum idle duration;

wherein the generation of the predetermined minimum idle duration occurs at least during part of the subsequent idle period; and wherein the processing resource is arranged to determine whether the data for signifying the idle period exceeds an average duration to support the initiation of transmission of the sub-channel data.

2. An apparatus as claimed in claim 1, wherein the processing resource is further arranged to initiate transmission of the sub-channel data in place of subsequent data for signifying the at least part of the subsequent idle period.

3. An apparatus as claimed in claim 1, further comprising:
memory operable to hold an extra packet constituting the sub-channel data;
memory operable to hold a parallel datastream while the extra packet is being sent; and control logic.

4. An apparatus as claimed in claim 1, wherein the processing resource is arranged to determine whether flow control is supported for the downstream communications on the main channel.

5. An apparatus as claimed in claim 1, wherein a pause duration is associated with the flow control message.

6. An apparatus as claimed in claim 5, wherein the processing resource is arranged to allow the pause duration to expire.

7. An apparatus as claimed in claim 1, wherein the processing resource is arranged to send a subsequent flow control message for receipt by the first network node, thereby terminating the subsequent idle period.

8. An apparatus as claimed in claim 7, wherein a pause duration is associated with the subsequent flow control message, the pause duration having a substantially zero time.

9. A probe for monitoring signals in a communications network, the probe comprising the apparatus as claimed in claim 1.

10. An interface converter module comprising the apparatus as claimed in claim 1.

11. A communications system for supporting a sub-channel within a main channel, the system comprising:
a first network node and a second network node for supporting the main channel therebetween;
a network monitoring apparatus for monitoring downstream communications from the first network node and generating measurement data in relation to a communication link between the first and second network nodes, the network monitoring apparatus being arranged to identify, when in use, a predetermined minimum idle duration in the downstream communications, and to determine whether the predetermined minimum idle duration will occur before the data store overflows, the predetermined minimum idle duration supporting initiation of transmission of the sub-channel data in place of at least part of data for signifying an idle period in the downstream communications;
a data store for temporarily storing sub-channel data comprised of the measurement data;
wherein the network monitoring apparatus is further arranged to transmit, when in use, a flow control message to the first network node, to cause generation of the predetermined minimum idle duration before the data store overflows;
wherein the network monitoring apparatus is further arranged to drop a packet of the sub-channel data from the data store in order to avoid overflow of the data store if the first network node does not implement flow control to reduce affect on the transmission of the main channel;
wherein the network monitoring apparatus is arranged to identify, when in use, the at least part of the data for signifying the idle period in the downstream communication, and to determine whether a subsequent idle period for the main channel will occur and whether insufficient time exists to await probabilistic occurrence of a subsequent idle period, the subsequent idle period being required when the data for signifying the idle period does not correspond to at least the predetermined minimum idle duration;
wherein the generation of the predetermined minimum idle duration occurs at least during part of the subsequent idle period; and
wherein the processing resource is arranged to determine whether the data for signifying the idle period exceeds an average duration to support the initiation of transmission of the sub-channel data.

12. A method of creating a sub-channel within a main channel between a first network node and a second network node, the method comprising:
generating measurement data in relation to a communication link between the first and second network nodes
temporarily storing sub-channel data comprising the measurement data in a data store;
monitoring downstream communications from the first network node;
identifying a predetermined minimum idle duration in the downstream communications;
determining whether the predetermined minimum idle duration will occur before the data store overflows, the predetermined minimum idle duration supporting initiation of transmission of the sub-channel data in place of at least part of data for signifying an idle period;
transmitting upstream a flow control message for receipt by the first network node, to cause generation of the predetermined minimum idle duration before the data store overflows; and
dropping a packet of the sub-channel data from the data store in order to avoid overflow of the data store if the first network node does no implement flow control;
identifying the at least part of the data for signifying the idle period in the downstream communication, and determining whether a subsequent idle period for the main channel will occur, and whether insufficient time exists to await probabilistic occurrence of a subsequent idle period, the subsequent idle period being required when the data for signifying the idle period does not correspond to at least the predetermined minimum idle duration;

wherein the generation of the predetermined minimum idle duration occurs at least during part of the subsequent idle period; and wherein the processing resource is arranged to determine whether the data for signifying the idle period exceeds an average duration to support the initiation of transmission of the sub-channel data.

13. A computer program product embodied on a non transitory computer program medium, that when executed on a computer causes the computer to execute the method of claim 12.

* * * * *